(12) United States Patent
Kalenski (10) Patent No.: US 10,259,303 B2
(45) Date of Patent: Apr. 16, 2019

(54) MAGNETIC BODY COVER SYSTEM FOR VEHICLES

(71) Applicant: Monika Eva Kalenski, San Diego, CA (US)

(72) Inventor: Monika Eva Kalenski, San Diego, CA (US)

( * ) Notice: Subject to any disclaimer, the term of this patent is extended or adjusted under 35 U.S.C. 154(b) by 9 days.

(21) Appl. No.: 15/441,743

(22) Filed: Feb. 24, 2017

(65) Prior Publication Data

US 2018/0244139 A1 Aug. 30, 2018

(51) Int. Cl.
*B60J 11/06* (2006.01)
*B60R 13/04* (2006.01)
*H01F 7/02* (2006.01)

(52) U.S. Cl.
CPC ............ *B60J 11/06* (2013.01); *H01F 7/0252* (2013.01); *B60Y 2410/132* (2013.01)

(58) Field of Classification Search
CPC .... B60Y 2410/132; B60J 11/06; B60R 13/04; H01F 7/0273
USPC ....................................................... 293/128
See application file for complete search history.

(56) References Cited

U.S. PATENT DOCUMENTS

| | | | |
|---|---|---|---|
| 3,665,355 A | 5/1972 | Sasaki et al. | |
| 3,910,330 A | 10/1975 | Johnson et al. | |
| 5,050,925 A | 9/1991 | Brown | |
| 6,491,335 B1 | 12/2002 | Cohill | |
| 7,486,165 B2 | 2/2009 | Ligtenberg | |
| 9,545,837 B2 | 1/2017 | Garfield | |
| 2003/0024195 A1 | 2/2003 | Koh et al. | |
| 2007/0278804 A1* | 12/2007 | Shields | B60J 11/025 293/128 |
| 2010/0007169 A1* | 1/2010 | Nguyen | B60J 11/06 296/136.07 |
| 2011/0226394 A1 | 9/2011 | Rodriguez | |
| 2014/0137448 A1 | 5/2014 | Reiter | |
| 2015/0001838 A1 | 1/2015 | Moroz | |
| 2015/0367926 A1* | 12/2015 | Perlo | B63H 25/42 440/6 |

OTHER PUBLICATIONS https://www.4WD.com/http://www.ruggedridge.com/magnetic-protection-panel-kit-4-door-07-15-jeep-wrangler-ik-12300-53.htm1/4 Wheel Drive Hardware-Online-Catalogue-July, 2015-4 pages-Columbiana,Ohio.
Engine-Erdog. Why Do Refrigerator Magnets only Stick on One Side? EngineerDog.com. Nov. 26, 2016; p. 2 of 12, Third Paragraph; p. 2 of 12—Refrigerator Magnet Halbach Array Demo video image.
Harrison, P. Trailskinz: Skin It. trailskinz.com. Dec. 12, 2012; p. 1 of 3; p. 2 of 3, Second Paragraph; p. 3 of 3.

(Continued)

*Primary Examiner* — Joseph D. Pape
*Assistant Examiner* — Dana D Ivey
(74) *Attorney, Agent, or Firm* — Olav M. Underdal; IDP Patent Services (57) ABSTRACT

A body cover system for installation on a vehicle can include a plurality of magnetic vehicle panels, each including a magnetic panel, a first image layer, and a first protective outer layer. The system can further include a secondary plurality of secondary vehicle panels, comprising a pressure sensitive adhesive layer, a second image layer, and optionally a second first protective outer layer. The magnetic panel can be configured as a Halbach array.

18 Claims, 5 Drawing Sheets

(56) References Cited

OTHER PUBLICATIONS

Gyroscope Circular Halbach Array Kit. Accessed at: http://www.gyroscope.com. Jul. 9, 2008; p. 1 of 3, Diagram 1; p. 1 of 3, kit description; Paragraph entitled 'What is a Halbach Array?'.

* cited by examiner

FIG. 1

Magnetic Cover System

MAGNETIC BODY COVER SYSTEM FOR VEHICLES

CROSS-REFERENCE TO RELATED APPLICATIONS

N/A.

FIELD OF THE INVENTION

The present invention relates generally to the field of cover system for vehicles, and more particularly to methods and systems for magnetic covers for vehicle, which include imprints of images.

BACKGROUND OF THE INVENTION

Owners of vehicles, including cars and jeeps, may have a desire to change the design of their vehicles and also protect the body panels and paint coating. Some options are available for protection of the vehicle coating, but these are generally not designed for easy customization of the visual appearance of the vehicle.

As such, considering the foregoing, it may be appreciated that there continues to be a need for novel and improved devices and methods for body cover systems for vehicles.

SUMMARY OF THE INVENTION

The foregoing needs are met, to a great extent, by the present invention, wherein in aspects of this invention, enhancements are provided to the existing models for protecting the surface coating of a vehicle.

In an aspect, a body cover system for installation on a vehicle can include a plurality of vehicle panels, which can be be installed on a surface of the vehicle, which for example can be a jeep.

In a related aspect, the body cover system can include:
a) a plurality of driver side vehicle panels, which can be installed on a driver side of a vehicle; and
b) a plurality of passenger side vehicle panels, which can be configured to be installed on a passenger side of a vehicle, such that the passenger side of the vehicle is substantially covered with the plurality of passenger side vehicle panels.

In another related aspect, a vehicle panel can be configured as a magnetic vehicle panel, including:
a) A magnetic panel;
b) An image layer, which is mounted on an outer side of the magnetic panel, such that the image layer has an image on an outer side; and
c) A protective outer layer, which is mounted on an outer side of the image layer, wherein the protective outer layer is transparent, such that the image is visible through the protective outer layer.

In a yet a related aspect, a body cover system can include:
a) a first plurality of magnetic vehicle panels, which can be installed on a surface of a vehicle; and
b) at least one secondary plurality of secondary vehicle panels, which can be installed on an outer surface of the first plurality of magnetic vehicle panels, such that each magnetic vehicle panel in the first plurality of magnetic vehicle panels corresponds to a matching secondary vehicle panel in the at least one secondary plurality of secondary vehicle panels, such that a shape of the magnetic vehicle panel matches with a shape of the matching secondary vehicle panel.

In a further related aspect, a secondary vehicle panel can include:
a) An image layer, which has an image on an outer side;
b) A pressure sensitive adhesive layer, on an inner side of the image layer, such that the pressure sensitive adhesive layer is configured to allow the secondary vehicle panel to be removably positioned on an outer side of a matching magnetic vehicle panel; and
c) A protective outer layer, which is mounted on an outer side of the image layer, wherein the protective outer layer is transparent such that the image is visible through the protective outer layer.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a magnetic body cover system 100 with reference to FIG. 1, in such manner that like reference numerals refer to like components throughout; a convention that we shall employ for the remainder of this specification.

Figure 1:
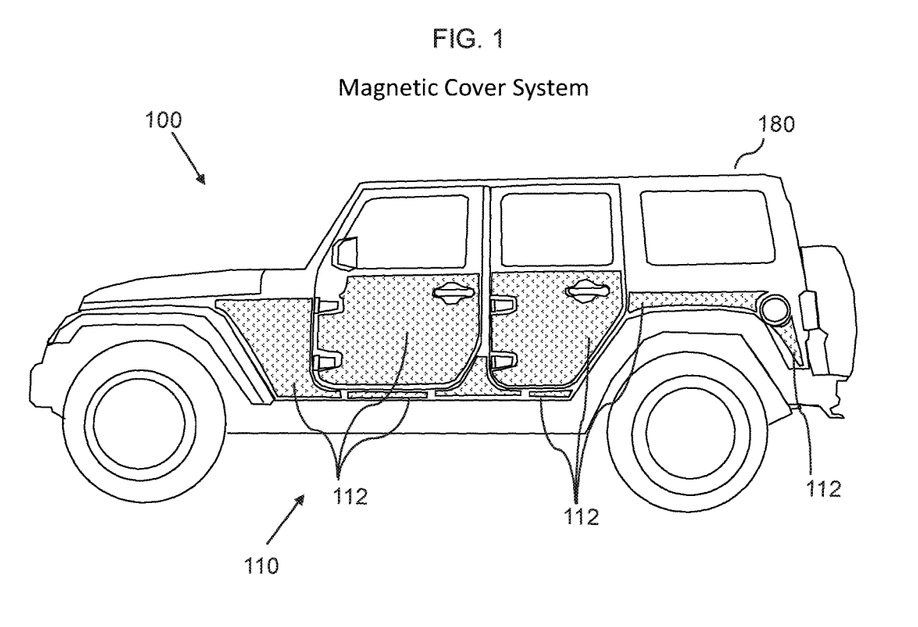
FIG. 1 is a side view of a body cover system installed on a vehicle, according to an embodiment of the invention.

In an embodiment, as shown in FIG. 1, a body cover system 100 for installation on a vehicle 180 can include:
 a) a plurality 110 of vehicle panels 112, which are configured to be installed on a surface of a vehicle 180, such as for example a jeep 180.

Figure 2:
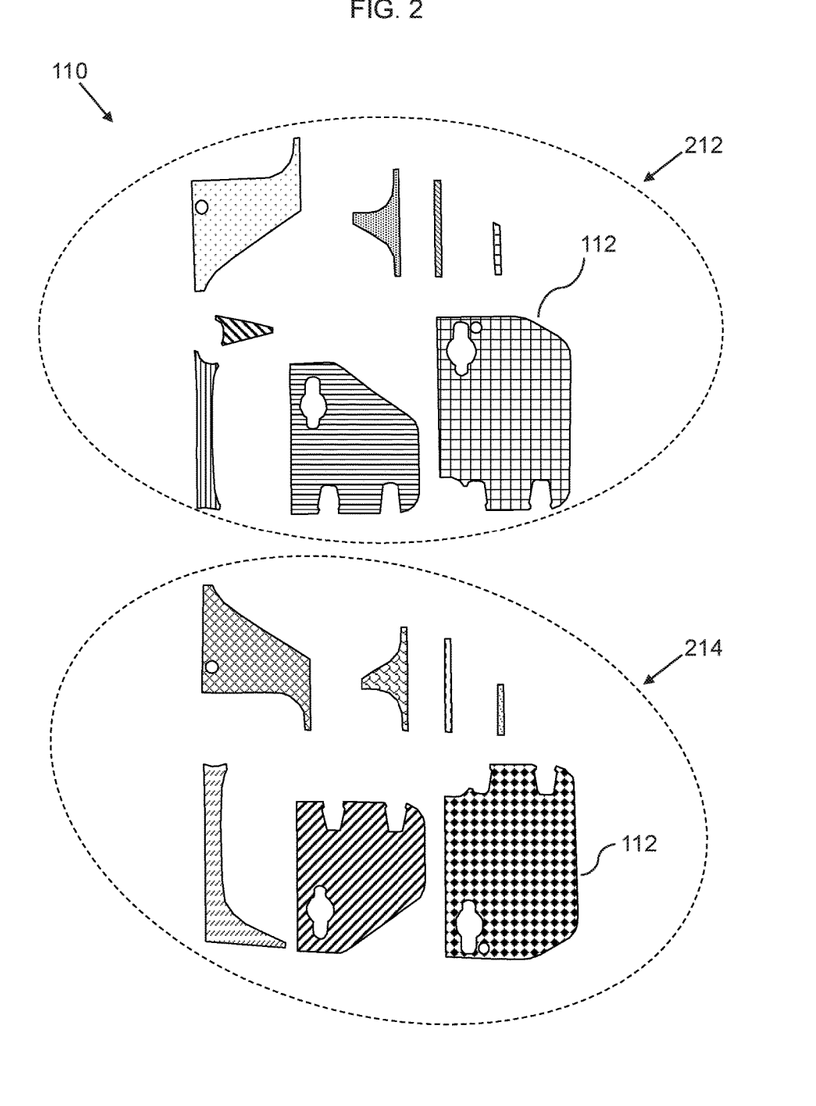
FIG. 2 is a side view of a body cover system, according to an embodiment of the invention.

In a related embodiment, as shown in FIG. 2, the body cover system 100 can include:
 a) a plurality of driver side vehicle panels 212, which are configured to be installed on a driver side of a vehicle 180, such that the driver side of the vehicle is substantially covered with the plurality of driver side vehicle panels 212; and
 b) a plurality of passenger side vehicle panels 214, which are configured to be installed on a passenger side of the vehicle 180, such that the passenger side of the vehicle 180 is substantially covered with the plurality of passenger side vehicle panels 214.

Figure 3A:
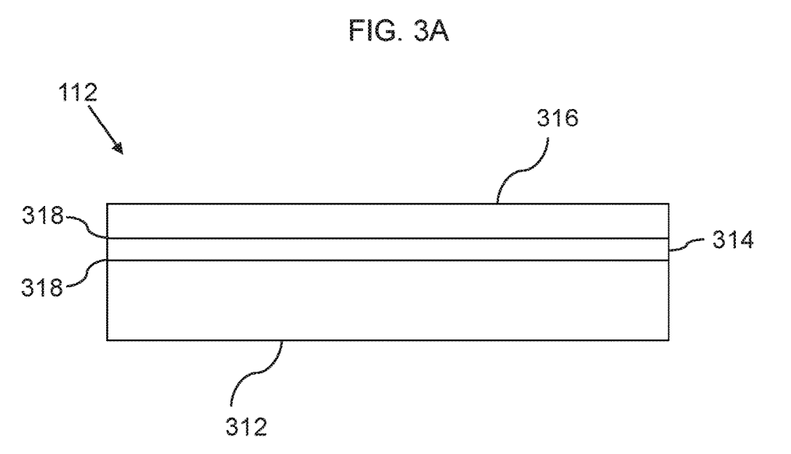
FIG. 3A is a cross-sectional view of a panel of a body cover system, according to an embodiment of the invention.

In a related embodiment, as shown in FIG. 3A, a vehicle panel 112 can be configured as a magnetic vehicle panel 112, including:
 a) A magnetic panel 312;
 b) An image layer 314, which is mounted on an outer side of the magnetic panel, such that the image layer 314 has an image on an outer side; and
 c) A protective outer layer 316, which is mounted on an outer side of the image layer 314, wherein the protective outer layer 316 is configured to be transparent, such that the image is visible through the protective outer layer 316.

In related embodiments, each vehicle panel 112 can be designed with a predetermined shape to fit to a part of a surface of vehicle 180, for example on front and rear fenders, doors and door seams.

Figure 3B:
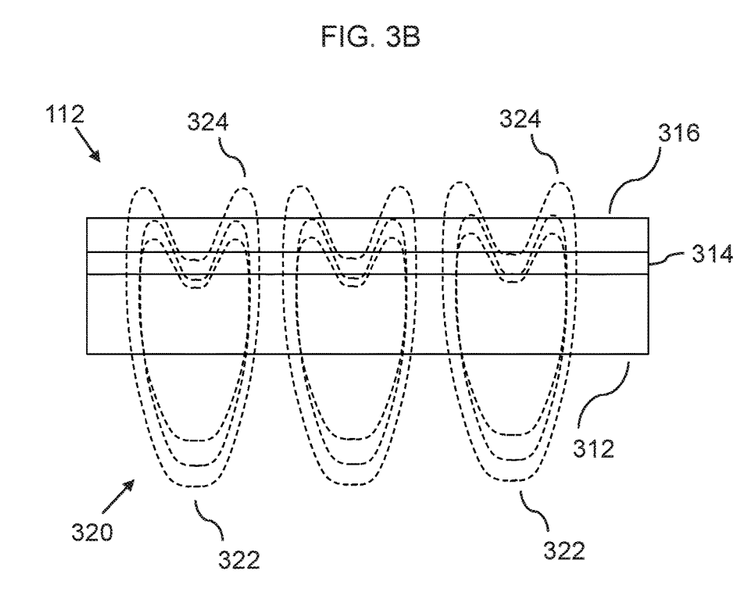
FIG. 3B is a cross-sectional view of a panel of a body cover system, according to an embodiment of the invention.

In a further related embodiment, as shown in FIG. 3B, the magnetic panel 312 can be configured as a Halbach array with a spatially rotating pattern of magnetization, such that a magnetic field 320 is maximized on an inner side 322 and minimized on an outer side 324.

In another further related embodiment, the magnetic panel 312 and the image layer 314 can be connected with pressure sensitive adhesive 318, and similarly the image layer 314 and the protective outer layer 316 can be connected with pressure sensitive adhesive 318. Alternatively, some other bonding or adhesion method can be used to connect the magnetic panel 312, the image layer 314, and the protective outer layer 316.

In related embodiments, the image that is imprinted on an outer side of the image layer can be a uniform color, a pattern, a photograph, or some other form of image. As indicated on FIG. 2, different images on each magnetic vehicle panel 112 in a plurality of driver side vehicle panels 212 214 can combine to form a combined image. Each magnetic vehicle panel 112 can for example show parts of a flag, such that the combined image shows a flag or a flag motif, a wooden look, or some other visual image. The combined image can for example depict a motif related to a hobby, a belief, or an interest.

Figure 4:
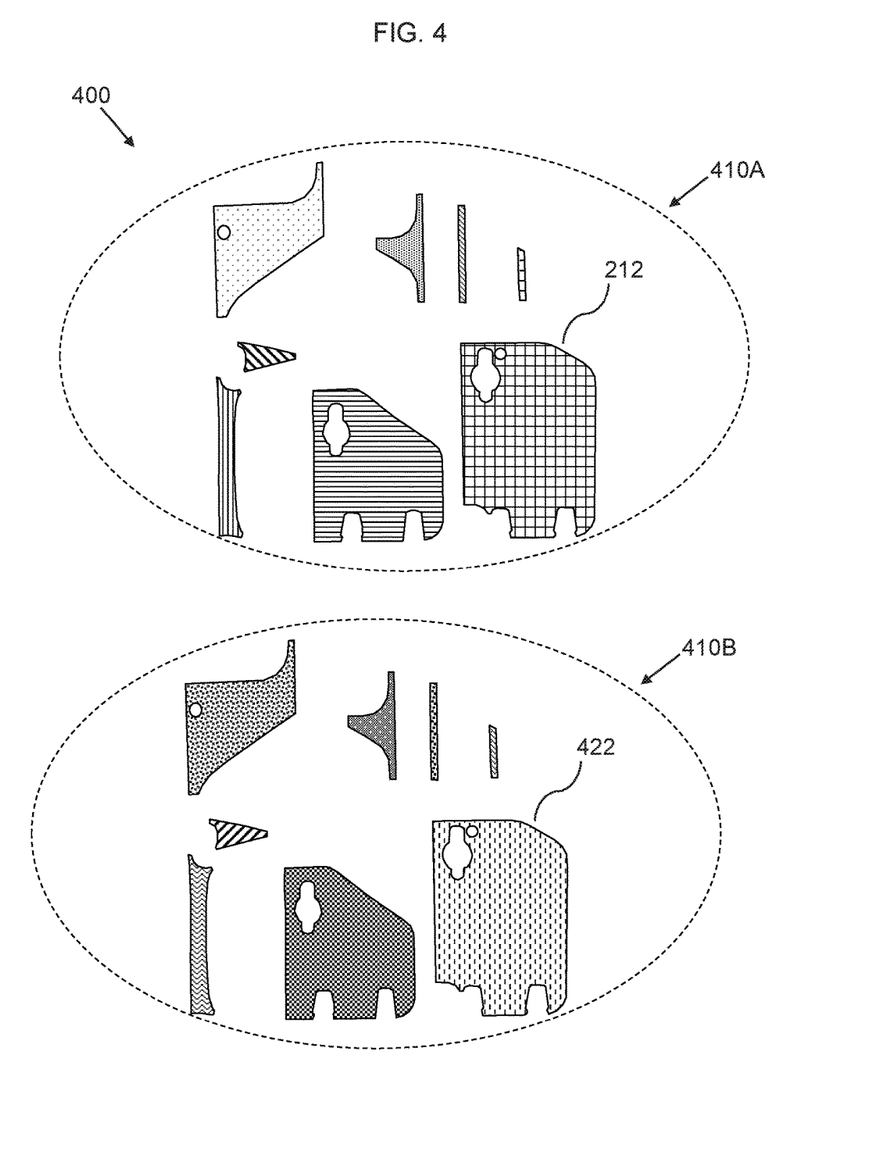
FIG. 4 is a side view of a body cover system, according to an embodiment of the invention.

In a related embodiment, as shown in FIG. 4, a body cover system 400 can include:
 a) a first plurality 410A of magnetic vehicle panels 212, which are configured to be installed on a surface of the vehicle 180; and
 b) at least one secondary plurality 410A of secondary vehicle panels 422, which are configured to be installed on an outer surface of the first plurality of magnetic vehicle panels 212, such that each magnetic vehicle panel 412 in the first plurality of magnetic vehicle panels 212 corresponds to a matching secondary vehicle panel 422 in the at least one secondary plurality of secondary vehicle panels 422, such that a shape of the magnetic vehicle panel 412 matches with a shape of the matching secondary vehicle panel 422.

Figure 5:
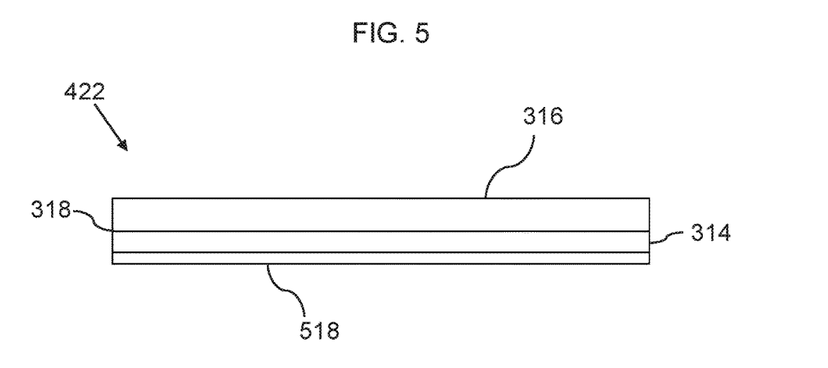
FIG. 5 is a cross-sectional view of a secondary panel of a body cover system, according to an embodiment of the invention.

In a further related embodiment, as shown in FIG. 5, a secondary vehicle panel 422 can include:
 a) An image layer 314, which is configured with an image on an outer side;
 b) A pressure sensitive adhesive layer 518, on an inner side of the image layer 314, such that the pressure sensitive adhesive layer 518 is configured to allow the secondary vehicle panel 422 to be removably positioned on an outer side of a matching magnetic vehicle panel 412. The pressure sensitive adhesive layer is configured to be sufficiently strong to hold the secondary vehicle panel 422 during driving, and sufficiently weak to allow easy removal and replacement; and
 c) A protective outer layer 316, which is mounted on an outer side of the image layer 314, wherein the protective outer layer 316 is configured to be transparent such that the image is visible through the protective outer layer.

In related embodiments, the image layer 314 and the protective outer layer 316 can each be made of a suitable plastic material, such as vinyl, including polyvinyl chloride.

In related embodiments, the body cover system 100 can be designed for the 2007 to 2017 Jeep Wrangler Unlimited™, and can also be referred to as Magnetic Jeep Armor™, which provides fully customizable protection wherever adventure takes a driver. The body cover system 100, which can also be referred to as MEK Magnet Jeep Armor™ can be manufactured as a very high performance heavy duty magnet panel engineered to provide superior side-body protection, which takes minutes to install and stays put through adverse weather, rough trails and even car washes.

In related embodiments, the body cover system 100 can be:
 a) Fully customizable and can allow a potential customer to provide a desired image, such that a vehicle for example can be turned into a mobile marketing billboard;
 b) Manufactured to be durable, weather and fade-resistant, providing great protection for both off-roading and everyday driving
 c) Designed for easy, commitment-free use. A user can put the system on a vehicle and later remove it at any time;
 d) Interchangeable, offering a plurality of customized looks for a vehicle, such as a jeep;
 e) Easy and fast in use, with installation taking only a few minutes.

In related embodiments, the magnetic vehicle panels 212 and the secondary vehicle panel 422 can have additional UV coating on an outer surface for increased durability in ambient environments.

Here has thus been described a multitude of embodiments of the body cover system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A body cover system for installation on a vehicle, comprising:
   a first plurality of vehicle panels, which are configured to be installed on a surface of the vehicle, wherein the first plurality of vehicle panels are configured as a first plurality of magnetic vehicle panels, each magnetic vehicle panel comprising:
   a magnetic panel; and
   a first image layer, which is mounted on an outer side of the magnetic panel, such that the first image layer is configured with a first image on an outer side of the first image layer; and
   at least one secondary plurality of secondary vehicle panels, which are configured to be installed on an outer surface of the first plurality of vehicle panels, such that each first vehicle panel in the first plurality of vehicle panels corresponds to a matching secondary vehicle panel in the at least one secondary plurality of secondary vehicle panels, such that a shape of the first vehicle panel matches with a shape of the matching secondary vehicle panel.

2. The body cover system of claim 1, wherein the magnetic panel is configured as a Halbach array with a spatially rotating pattern of magnetization, such that a magnetic field is maximized on the outer side of the magnetic panel and minimized on an inner side of the magnetic panel.

3. The body cover system of claim 1, wherein each magnetic vehicle panel further comprises:
   a first protective outer layer, which is mounted on the outer side of the first image layer, wherein the first protective outer layer is configured to be transparent, such that the first image is visible through the first protective outer layer.

4. The body cover system of claim 3, wherein the magnetic panel and the first image layer is connected with a first pressure sensitive adhesive, and the first image layer and the first protective outer layer is connected with a second pressure sensitive adhesive.

5. The body cover system of claim 1, wherein the first plurality of magnetic vehicle panels further comprises:
   a) a plurality of driver side vehicle panels, which are configured to be installed on a driver side of the vehicle, such that the driver side of the vehicle is substantially covered with the plurality of driver side vehicle panels; and
   b) a plurality of passenger side vehicle panels, which are configured to be installed on a passenger side of the vehicle, such that the passenger side of the vehicle is substantially covered with the plurality of passenger side vehicle panels.

6. The body cover system of claim 1, wherein each secondary vehicle panel further comprises:
   a) a second image layer, which is configured with a second image on an outer side of the second image layer; and
   b) a pressure sensitive adhesive layer, on an inner side of the second image layer, such that the pressure sensitive adhesive layer is configured to allow the secondary vehicle panel to be removably positioned on an outer side of a matching magnetic vehicle panel.

7. The body cover system of claim 6, wherein each secondary vehicle panel further comprises:
   a second protective outer layer, which is mounted on the outer side of the second image layer, wherein the second protective outer layer is configured to be transparent, such that the second image is visible through the second protective outer layer.

8. A body cover system for installation on a vehicle, comprising:
   a) a first plurality of vehicle panels, which are configured to be installed on a surface of the vehicle, wherein the first plurality of vehicle panels are configured as a plurality of magnetic vehicle panels, each magnetic vehicle panel comprising:
   a magnetic panel; and
   a first image layer, which is mounted on an outer side of the magnetic panel, such that the first image layer is configured with a first image on an outer side of the first image layer; and
   b) at least one secondary plurality of secondary vehicle panels, which are configured to be installed on an outer surface of the first plurality of vehicle panels, such that each first vehicle panel in the first plurality of vehicle panels corresponds to a matching secondary vehicle panel in the at least one secondary plurality of secondary vehicle panels, such that a shape of the first vehicle panel matches with a shape of the matching secondary vehicle panel.

9. The body cover system of claim 8, wherein the magnetic panel is configured as a Halbach array with a spatially rotating pattern of magnetization, such that a magnetic field is maximized on the outer side of the magnetic panel and minimized on an inner side of the magnetic panel.

10. The body cover system of claim 8, wherein each magnetic vehicle panel further comprises:
    a first protective outer layer, which is mounted on the outer side of the first image layer, wherein the first protective outer layer is configured to be transparent, such that the first image is visible through the first protective outer layer.

11. The body cover system of claim 10, wherein the magnetic panel and the first image layer is connected with a first pressure sensitive adhesive, and the first image layer and the first protective outer layer is connected with a second pressure sensitive adhesive.

12. The body cover system of claim 8, wherein each secondary vehicle panel further comprises:
    a) a second image layer, which is configured with a second image on an outer side of the second image layer; and
    b) a pressure sensitive adhesive layer, on an inner side of the second image layer, such that the pressure sensitive adhesive layer is configured to allow the secondary vehicle panel to be removably positioned on an outer side of a matching magnetic vehicle panel.

13. The body cover system of claim 12, wherein each secondary vehicle panel further comprises:

a second protective outer layer, which is mounted on the outer side of the second image layer, wherein the second protective outer layer is configured to be transparent, such that the second image is visible through the second protective outer layer.

14. The body cover system of claim 8, wherein the plurality of magnetic vehicle panels further comprises:
   a) a plurality of driver side vehicle panels, which are configured to be installed on a driver side of the vehicle, such that the driver side of the vehicle is substantially covered with the plurality of driver side vehicle panels; and
   b) a plurality of passenger side vehicle panels, which are configured to be installed on a passenger side of the vehicle, such that the passenger side of the vehicle is substantially covered with the plurality of passenger side vehicle panels.

15. A body cover system for installation on a vehicle, comprising:
   a first plurality of vehicle panels, which are configured to be installed on a surface of the vehicle; wherein the first plurality of vehicle panels are configured as a first plurality of magnetic vehicle panels, each magnetic vehicle panel comprising:
   a magnetic panel; and
   a first image layer, which is mounted on an outer side of the magnetic panel, such that the first image layer is configured with a first image on an outer side of the first image layer;
   wherein the magnetic panel is configured as a Halbach array with a spatially rotating pattern of magnetization, such that a magnetic field is maximized on the outer side of the magnetic panel and minimized on an inner side of the magnetic panel.

16. The body cover system of claim 15, further comprising:
   at least one secondary plurality of secondary vehicle panels, which are configured to be installed on an outer surface of the first plurality of magnetic vehicle panels, such that each magnetic vehicle panel in the first plurality of magnetic vehicle panels corresponds to a matching secondary vehicle panel in the at least one secondary plurality of secondary vehicle panels, such that a shape of the magnetic vehicle panel matches with a shape of the matching secondary vehicle panel.

17. The body cover system of claim 16, wherein each secondary vehicle panel further comprises:
   a) a second image layer, which is configured with a second image on an outer side of the second image layer; and
   b) a pressure sensitive adhesive layer, on an inner side of the second image layer, such that the pressure sensitive adhesive layer is configured to allow the secondary vehicle panel to be removably positioned on an outer side of a matching magnetic vehicle panel.

18. The body cover system of claim 17, wherein each secondary vehicle panel further comprises:
   a second protective outer layer, which is mounted on the outer side of the second image layer, wherein the second protective outer layer is configured to be transparent, such that the second image is visible through the second protective outer layer.

* * * * *